US011266249B2

(12) United States Patent
Roberts

(10) Patent No.: US 11,266,249 B2
(45) Date of Patent: Mar. 8, 2022

(54) DYNAMICALLY ORIENTABLE SEATING DEVICE

(71) Applicant: Arthur A. Roberts, Ashford, CT (US)

(72) Inventor: Arthur A. Roberts, Ashford, CT (US)

( * ) Notice: Subject to any disclaimer, the term of this patent is extended or adjusted under 35 U.S.C. 154(b) by 47 days.

(21) Appl. No.: 16/456,662

(22) Filed: Jun. 28, 2019

(65) Prior Publication Data
US 2019/0320873 A1    Oct. 24, 2019
US 2021/0282622 A9    Sep. 16, 2021

Related U.S. Application Data

(62) Division of application No. 16/013,933, filed on Jun. 20, 2018, now Pat. No. 10,342,356.

(60) Provisional application No. 62/522,185, filed on Jun. 20, 2017.

(51) Int. Cl.
*A47C 15/00* (2006.01)
*G07F 17/32* (2006.01)
*G09B 9/02* (2006.01)
*G09B 9/05* (2006.01)
*G09B 9/12* (2006.01)
*G09B 9/04* (2006.01)
*A47L 23/20* (2006.01)
*A47C 1/032* (2006.01)

(52) U.S. Cl.
CPC ........... *A47C 15/004* (2013.01); *A47L 23/20* (2013.01); *G07F 17/3216* (2013.01); *G09B 9/02* (2013.01); *G09B 9/04* (2013.01); *G09B 9/05* (2013.01); *G09B 9/12* (2013.01); *A47C 1/03211* (2013.01); *A63F 2300/8082* (2013.01)

(58) Field of Classification Search
CPC ....... A47C 3/18; A47C 3/0251; A47C 15/004; A47C 1/03211; G07F 17/3216; G09B 9/02; A63F 2300/8082
See application file for complete search history.

(56) References Cited

U.S. PATENT DOCUMENTS 2,920,685 A * 1/1960 Trebilcockannae ... A47D 13/10
                                                    297/314
3,085,354 A * 4/1963 Rasmussen ............... G09B 9/12
                                                    434/31
4,710,128 A * 12/1987 Wachsmuth ............. G09B 9/12
                                                    434/30
4,974,904 A * 12/1990 Phillips ................... A47C 9/002
                                                    297/258.1

(Continued)

*Primary Examiner* — Philip F Gabler
(74) *Attorney, Agent, or Firm* — Alexander Franco

(57) ABSTRACT

An orientable seating device includes a seat, the orientation of which can be controlled to dynamically affect a desired of yaw, pitch and roll. The seating device can be used to reorient and/or to simulate motion for a seated person for use with video games, virtual reality headsets or goggles, land, water, air or space vehicle simulation, or wireless airborne drones, for example. The device includes a seat mounted on a carriage, which is received in a carriage pedestal. Within the pedestal, a drive wheel positioned under the carriage supports and rotates the carriage by driving an outer sphere-shaped surface of the carriage. The drive wheel can be reoriented around a vertical axis such that any combination of pitch and roll can be achieved by rotating the wheel against the sphere-shaped surface. Yaw can be controlled by a rotatable platform upon which the carriage pedestal can be mounted.

15 Claims, 7 Drawing Sheets

(56) References Cited

U.S. PATENT DOCUMENTS

| | | | | |
|---|---|---|---|---|
| 5,048,893 | A * | 9/1991 | Cowan | A47C 1/023 297/329 |
| 5,143,055 | A * | 9/1992 | Eakin | A61H 23/0236 297/217.4 |
| 5,353,242 | A * | 10/1994 | Crosbie | G09B 9/12 434/55 |
| 5,590,930 | A * | 1/1997 | Glockl | A47C 3/0257 297/313 |
| 5,702,307 | A * | 12/1997 | Moran | A63G 31/16 472/130 |
| 5,954,508 | A * | 9/1999 | Lo | G09B 9/02 297/257 |
| 7,866,747 | B2 * | 1/2011 | Park | A47C 15/004 297/217.4 |
| 7,938,489 | B2 * | 5/2011 | Nazari | A47C 3/0257 297/314 |
| 8,182,036 | B2 * | 5/2012 | Nishino | A47C 3/0257 297/259.1 |
| 8,967,716 | B2 * | 3/2015 | Mountz | A47C 9/02 297/256.12 |
| 9,398,811 | B1 * | 7/2016 | Williams | A47C 3/18 |
| 10,092,112 | B1 * | 10/2018 | Waszak | A47D 15/008 |
| 10,342,356 | B1 * | 7/2019 | Roberts | G07F 17/3216 |
| 2007/0035164 | A1 * | 2/2007 | North | A47C 7/541 297/217.1 |
| 2016/0320862 | A1 * | 11/2016 | Schradin | G06F 3/011 |

* cited by examiner

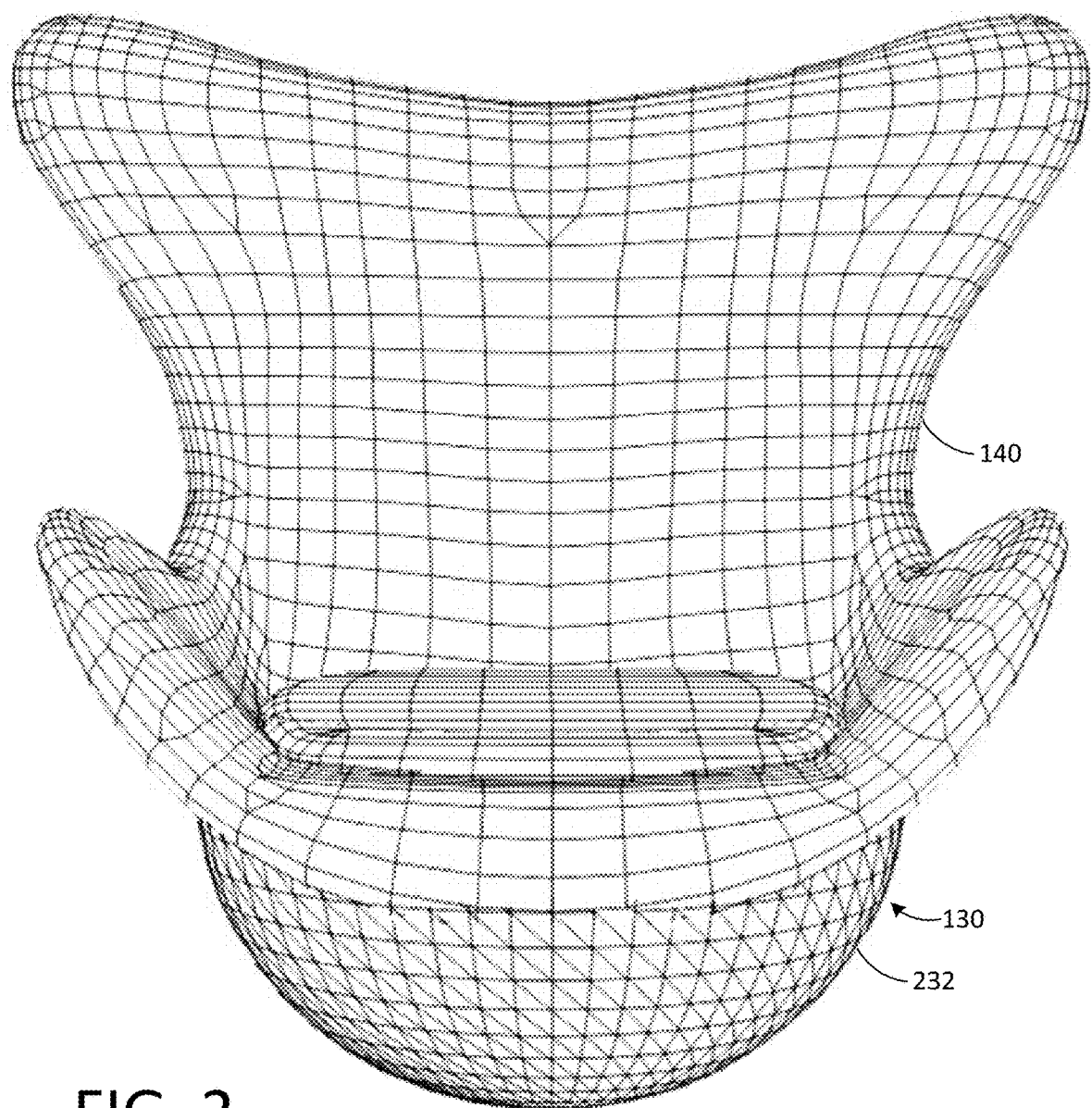
FIG. 2
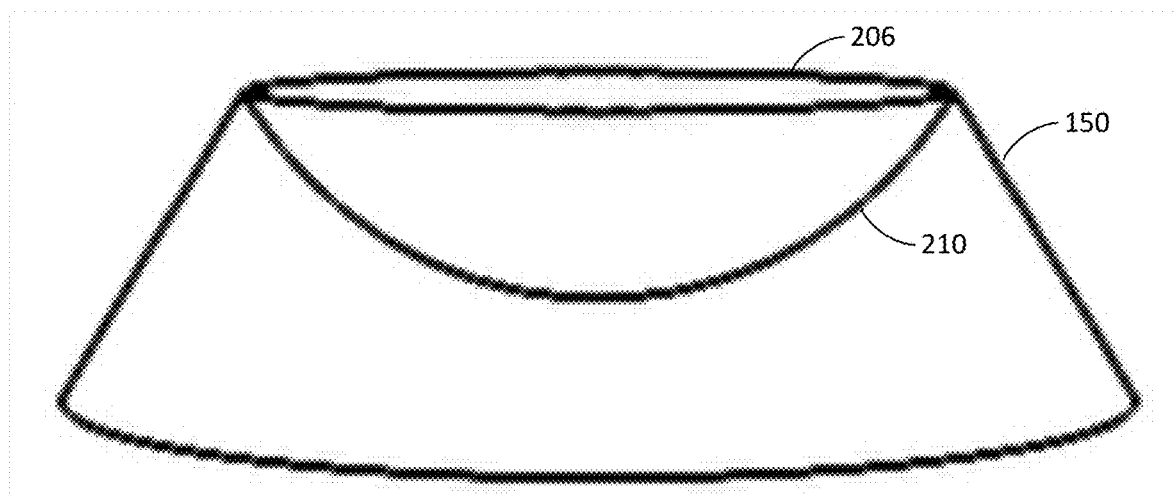

DYNAMICALLY ORIENTABLE SEATING DEVICE

RELATED APPLICATIONS

The subject matter of this application is related to U.S. application Ser. No. 16/013,933, filed on 2018 Jun. 20, now U.S. Pat. No. 10,342,356, and U.S. Provisional Application No. 62/522,185, filed on 2017 Jun. 20, all of which applications are incorporated herein by reference in their entireties.

BACKGROUND OF THE INVENTION

Motion simulation devices, such as flight simulators, have been long known, but existing implementations are generally bulky, complex and expensive, making them impractical for home use. The availability of virtual reality headsets makes it practical to separate the simulation of motion upon a person's body from the visual and audio aspects of a simulation environment. There is thus a need for smaller, simpler and less expensive solutions to motion simulation that can, for example, be used with virtual reality headsets in a residential setting.

SUMMARY OF THE INVENTION

An orientable seating device includes a seat, the orientation of which can be controlled to dynamically affect a desired of yaw, pitch and roll. The seating device can be used to reorient and/or to simulate motion for a seated person for use with video games, virtual reality headsets or goggles, land, water, air or space vehicle simulation, or wireless airborne drones, for example. The device includes a seat mounted on a carriage, which is received in a carriage pedestal. Within the pedestal, a drive wheel positioned under the carriage supports and rotates the carriage by driving an outer sphere-shaped surface of the carriage. The drive wheel can be reoriented around a vertical axis such that any combination of pitch and roll can be achieved by rotating the wheel against the sphere-shaped surface. Yaw can be controlled by a rotatable platform upon which the carriage pedestal can be mounted.

A dynamically orientable seating device can include: a base for supporting the dynamically orientable seating device; a rotatable platform rotatably mounted on the base, the rotatable platform configured to rotate about a vertical axis relative to the base; a first drive mechanism configured to rotate the rotatable platform about the vertical axis relative to the base; an actuatable seat carriage having a driven support surface shaped in a form of a portion of a sphere; a seat fixedly mounted on or within the seat carriage; a seat carriage pedestal fixedly mounted on the rotatable platform, the seat carriage pedestal receiving the seat carriage and fixing a horizontal and vertical position of the seat carriage relative to the rotatable platform; a second drive mechanism comprising a drive wheel configured to engage with and support the driven support surface of the seat carriage in order to reorient the seat carriage; and an orientation sensor configured to detect an orientation of the seat carriage.

The device can further include a turntable positioned beneath the seat carriage and having a vertical axis of rotation centered on a lowest point on the support surface of the seat carriage, wherein the drive wheel of the second drive mechanism is mounted directly or indirectly to the turntable such that the drive wheel rotates about a horizontal axis, and wherein the horizontal axis rotates with the turntable as the turntable rotates about the vertical axis of rotation. The device can further include a third drive mechanism configured to rotate the turntable about the vertical axis of rotation. The turntable can be mounted on and rotate relative to the rotatable platform. The turntable can be mounted on and rotate relative to the base.

The device can further include an alignment mechanism configured to prevent rotation around a vertical axis of the seat carriage relative to the seat carriage pedestal. The alignment mechanism can include: an alignment pin that extends from the seat carriage along an axis extending from a center of the sphere; and an alignment track mounted to the seat carriage pedestal or the rotatable platform, the alignment track having a shape of a portion of a vertically oriented circle centered on the center of the sphere, whereby the alignment pin and the alignment track engage to permit only pitch and roll of the seat carriage, and whereby yaw of the seat carriage is established by the rotatable platform. The alignment mechanism can further include: a first gimbal mounted to the seat carriage pedestal or the rotatable platform, the first gimbal having a horizontal axis of rotation that extends through the center of the sphere; a second gimbal mounted to the seat carriage and having an axis of rotation that extends through the center of the sphere; and a connecting arm connecting the first gimbal to the second gimbal such that the axis of rotation of the second gimbal is orthogonal to and free to rotate about the axis of rotation of the first gimbal.

The orientation sensor can include: a first position sensor configured to determine an orientation of the rotatable platform relative to the base; a second position sensor configured to determine an angle of the first gimbal; and a third position sensor configured to determine an angle of the second gimbal. The orientation sensor can include: a first position sensor configured to determine an orientation of the rotatable platform relative to the base; a second position sensor configured to determine a roll of the seat carriage; and a third position sensor configured to determine a pitch of the seat carriage. The driven outer support surface can include a plurality of machine-readable markings readable to determine the orientation of the seat carriage, wherein the orientation sensor includes at least one optical scanner configured and positioned to read the machine-readable markings. The orientation sensor can include a gyroscope attached to the seat carriage.

A dynamically orientable seating device can include: an actuatable seat carriage having a driven support surface shaped in a form of a portion of a sphere; a seat fixedly mounted on or within the seat carriage; a seat carriage pedestal receiving the seat carriage and fixing a horizontal and vertical position of the seat carriage relative to the seat carriage; a turntable positioned beneath the seat carriage and having a vertical axis of rotation centered on a lowest point on the driven support surface of the seat carriage; a third drive mechanism configured to rotate the turntable about the vertical axis of rotation; a second drive mechanism comprising a drive wheel mounted directly or indirectly to the turntable, the drive wheel configured to engage with and support the lowest point on the driven support surface of the seat carriage, wherein the drive wheel has a horizontal axis of rotation that rotates with the turntable as the turntable rotates about the vertical axis of rotation; and an orientation sensor configured to detect an orientation of the seat carriage.

The device can further include: a base, wherein the seat carriage pedestal is rotatably mounted directly or indirectly to the base and to rotate about a vertical axis relative to the base; and a first drive mechanism configured to rotate the rotatable platform about the vertical axis relative to the base. The seat carriage pedestal can be a rotatable seat carriage pedestal mounted directly to the base. The device can further include: a rotatable platform rotatably mounted on the base, wherein the seat carriage pedestal is mounted to the rotatable platform. The turntable can be mounted on and rotate relative to the rotatable platform.

The device can further include an alignment mechanism configured to prevent rotation around a vertical axis of the seat carriage relative to the seat carriage pedestal. The alignment mechanism can include: an alignment pin that extends from the seat carriage along an axis extending from a center of the sphere; and an alignment track fixed relative to the seat carriage pedestal, the alignment track having a shape of a portion of a vertically oriented circle centered on the center of the sphere, whereby the alignment pin and the alignment track engage to permit only pitch and roll of the seat carriage, and whereby yaw of the seat carriage is established by the rotatable platform. The alignment mechanism can include: a first gimbal fixed relative to the seat carriage pedestal, the first gimbal having a horizontal axis of rotation that extends through the center of the sphere; a second gimbal mounted to the seat carriage and having an axis of rotation that extends through the center of the sphere; and a connecting arm connecting the first gimbal to the second gimbal such that the axis of rotation of the second gimbal is orthogonal to and free to rotate about the axis of rotation of the first gimbal.

BRIEF DESCRIPTION OF THE DRAWINGS

FIG. 2 illustrates an exploded view of the dynamically orientable seating device.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

Figure 1:
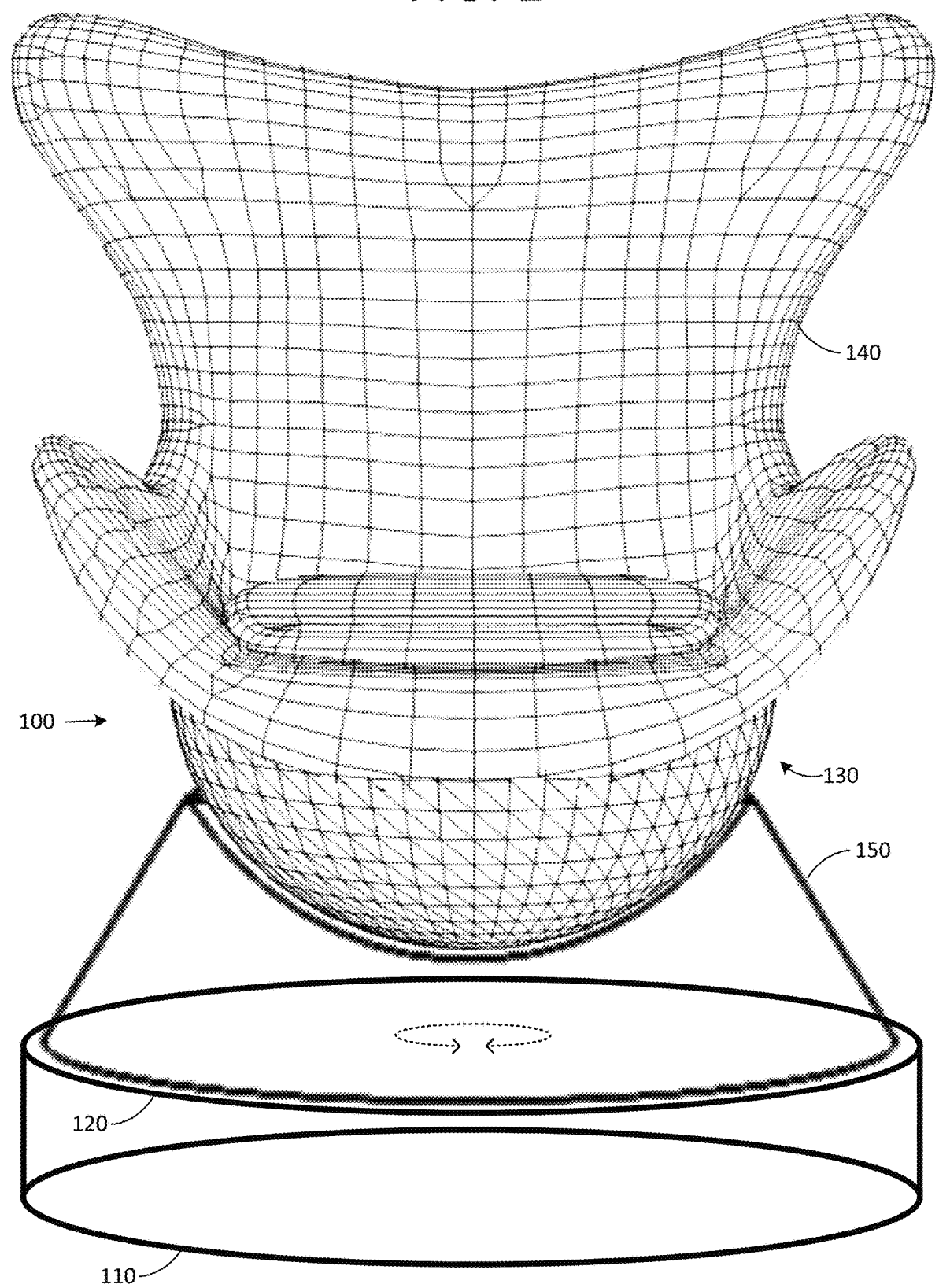
FIG. 1 illustrates a dynamically orientable seating device in accordance with one embodiment.

FIG. 1 illustrates a dynamically orientable seating device 100 in accordance with one embodiment. The dynamically orientable seating device includes a base 110, a rotatable platform 120, an actuatable seat carriage 130, a seat 140, and a seat carriage pedestal 150. The base 110 is illustrated in outline/wireframe view showing both front and back sides. The seat carriage pedestal 150 is illustrated in a partial cutaway view showing how the seat carriage 130 rests within the seat carriage pedestal 150.

The base 110 can be or include, for example, a plate or frame having mounting points for additional components of the device 100. The base 106 can include feet or legs (not illustrated) for positioning the device 100 on a floor or other suitable surface for use. The base 110 can also or alternatively include mounting points or brackets for attachment to another stationary structure such as a platform, or a movable structure, such as a portion of an amusement ride.

FIG. 2 illustrates an exploded view of the dynamically orientable seating device 100 showing the actuatable seat carriage 130 and seat 140 separated from the seat carriage pedestal 150. The seat carriage pedestal 150 is shown in partial outline/wireframe view to better illustrate a rim 206 of the pedestal 150 as well as an internal cup shaped receptacle 210 for receiving the actuatable seat carriage 130 and holding it in place in accordance with one embodiment. The actuatable seat carriage 130 can be configured with an external driven support surface 232 shaped in the form of part of a sphere.

Figure 3:
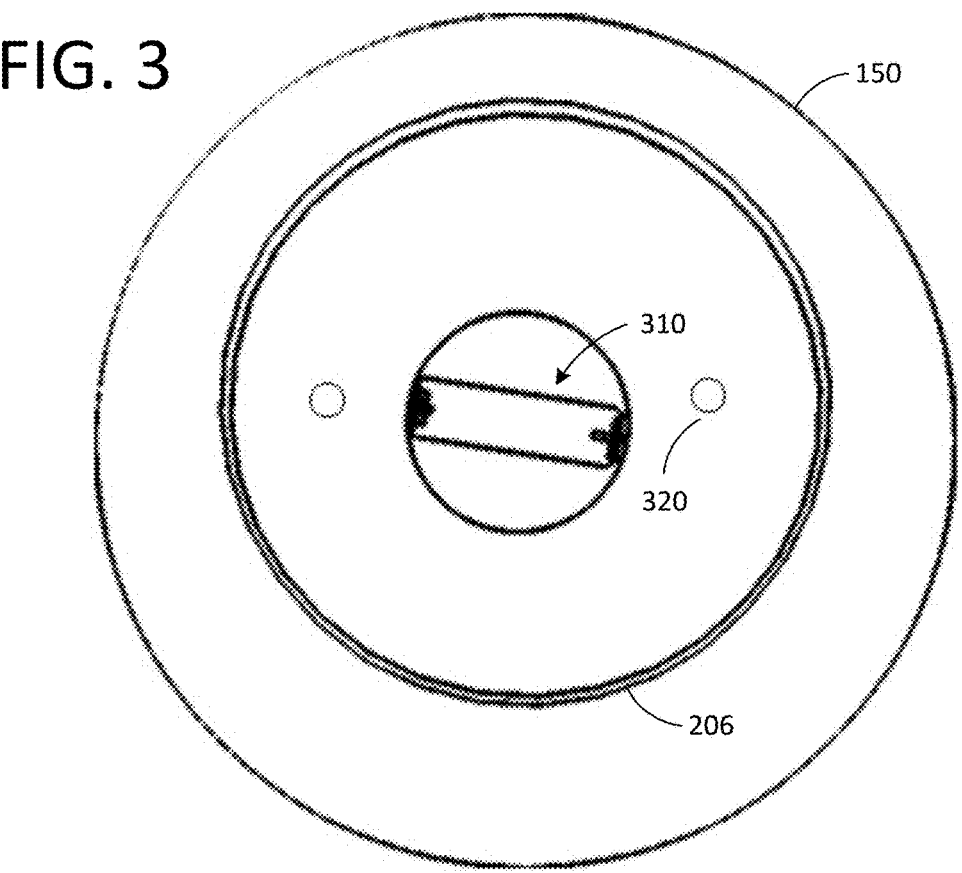
FIG. 3 illustrates an overhead view of the seat carriage pedestal with the seat carriage and seat removed.

FIG. 3 illustrates an overhead view of the seat carriage pedestal 150 with the seat carriage 130 and seat 140 removed. Within the seat carriage pedestal 150 a drive wheel 310 can be configured to support the seat carriage 130 and to control pitch and roll as will be discussed below.

Figure 4:
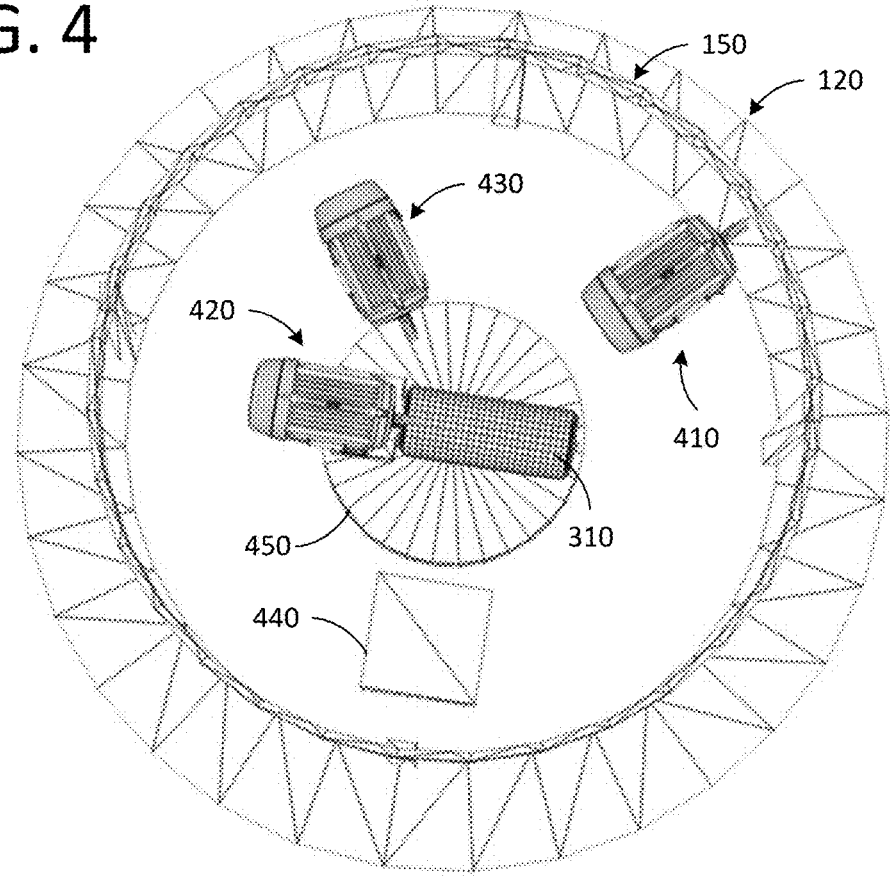
FIG. 4 illustrates an overhead internal component diagram of the rotatable platform and the seat carriage pedestal.

FIG. 4 illustrates an overhead internal component diagram of the rotatable platform 120 and the seat carriage pedestal 150 showing a first drive mechanism 410, a second drive mechanism 420, a third drive mechanism 430 and a turntable 450 that control the simulated motion of the device in accordance with one embodiment. The base 110 can be configured to house electronics 440 for controlling the device 100.

Figure 5:
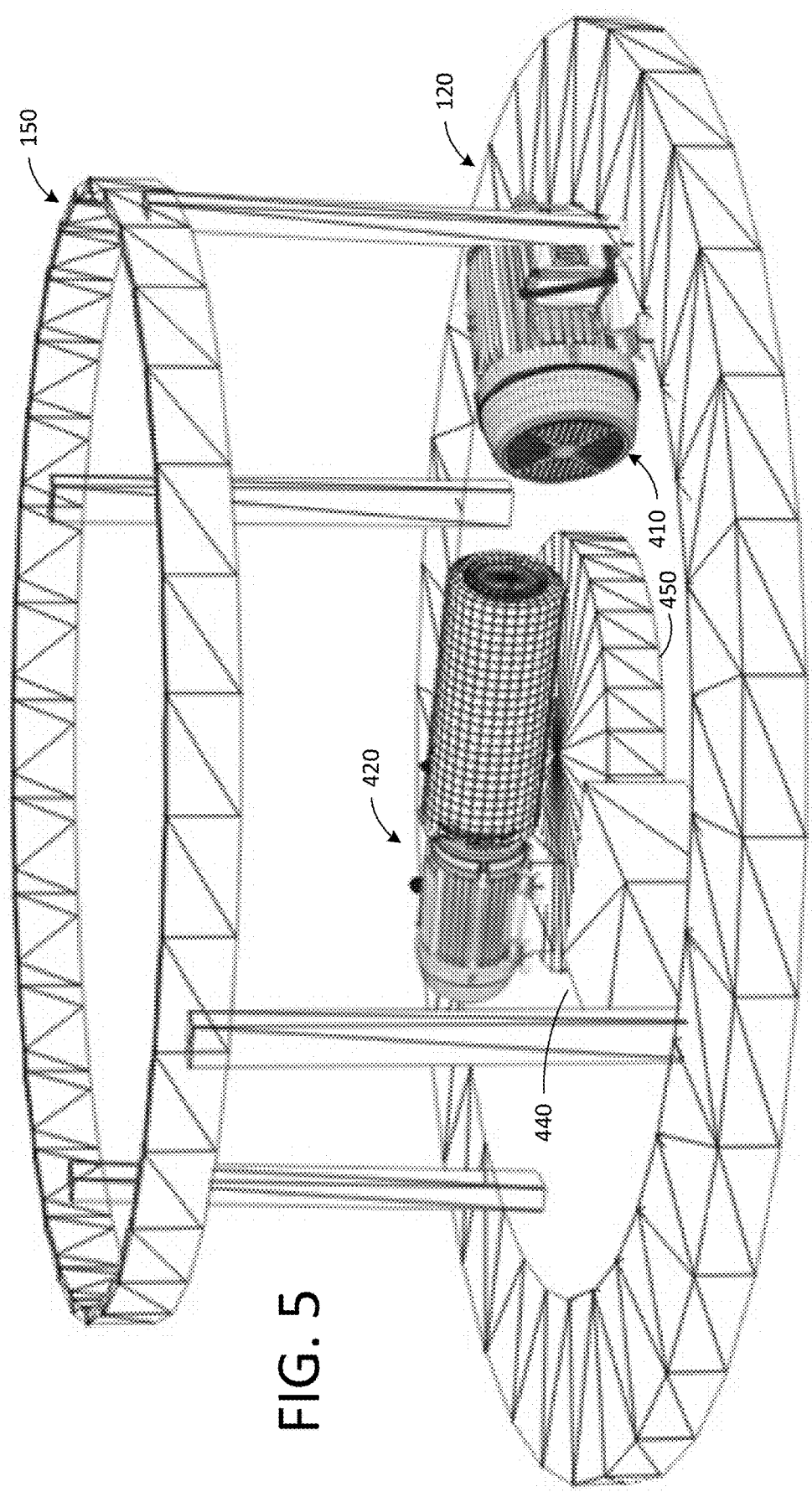
FIG. 5 illustrates a perspective internal component diagram of the rotatable platform and the seat carriage pedestal.

FIG. 5 illustrates a perspective internal component diagram of the rotatable platform 120 and the seat carriage pedestal 150 showing the first drive mechanism 410, the second drive mechanism 420, the electronics 440 and the turntable 450 in accordance with one embodiment.

Referring to FIGS. 2, 3, 4 and 5, the first drive mechanism 410 can be configured to rotate the rotatable platform 120 relative to the base 110. The rotatable platform 120 can be mounted on the base 110 and configured to rotate about a vertical axis relative to the base 110. The rotatable platform 120 can be mounted using a turntable or bearing race that permits rotational movement of the rotatable platform 120 relative to the base 110. The first drive mechanism 410 can be, for example, a motor mounted to the base 110. The motor can drive a wheel that in turn engages with a circular track on the rotatable platform. Alternatively, the motor shaft can drive a belt that engages with a pulley that is mounted to the rotatable platform along the vertical axis. The seat carriage pedestal 150 can be mounted to the rotatable platform 120 so that the two rotate in unison. The seat carriage 130 can further be configured to rotate with seat carriage pedestal 150 and rotatable platform 120. Accordingly, actuation of the first drive mechanism 410 can be used to control the yaw of the seat 140 by rotating the seat carriage pedestal 150 through the rotatable platform 120 and/or the seat carriage pedestal 150. In one embodiment, the rotatable platform 120 and the seat carriage pedestal 150 can be integrated into a single unit as a rotatable seat carriage pedestal.

The second drive mechanism 420 can be configured to drive the drive wheel 310 that in turn can support and appropriately tilt the actuatable seat carriage 130 to achieve pitch and roll changes. The drive wheel 310 engages with the driven support surface 232 of the seat carriage 130 and as the wheel rotates, so does the seat carriage.

The drive wheel 310, and optionally part or all of the second drive mechanism 420 can be mounted on the turntable 450 that rotates about a vertical axis so that the orientation of the drive wheel can 310 can be manipulated to change the direction in which the seat carriage rotates when the drive wheel turns 310. In one embodiment, as illustrated in FIGS. 4 and 5, the drive wheel can be mounted on a horizontal shaft of a motor that is in turn mounted to the turntable 450. In one embodiment, the drive wheel can also or alternatively be supported by one or more bearings that are in turn mounted to the turntable 450 so that the drive wheel rotates around a horizontal axis. As the turntable 450 is rotated, the horizontal axis, about which the drive wheel rotates, in turn rotates about a vertical axis in order to change the orientation of the drive wheel. The turntable 450 can be positioned beneath and centered on a lowest point of the seat carriage in order to support the drive wheel 310 which in turn can support the seat carriage.

The rim 206 of the seat carriage pedestal 150 can be configured to retain the seat carriage 130 in place as the drive wheel 310 tilts the seat carriage 130. Optionally, the rim 206 and/or an internal portion or portions of the seat carriage pedestal 150 can be lined with one or more slides, such as Teflon slides, that allow the seat carriage 130 to slide within the seat carriage pedestal such that its orientation can be adjusted by the drive wheel 310.

A third drive mechanism 430 can be configured to rotate the turntable 450. The third drive mechanism 430 and the turntable 450 can each be mounted on the rotatable platform 120 or the base 110. The turntable 450 can be mounted using a bearing race that permits rotational movement relative to its mounting. The third drive mechanism 430 can be, for example, a motor mounted to the rotatable platform 120 or the base 110. The motor can drive a wheel that in turn engages with a circular track on the turntable. Alternatively, the motor shaft can drive a belt that engages with a pulley that is mounted to the turntable along the vertical axis. By appropriately orienting the rotation of the drive wheel 310 in conjunction with controlling the rate of rotation of the drive wheel, any combination of pitch and roll change can be achieved.

The term rotatable platform 120 is used herein merely as a matter of convenience to distinguish from the turntable 450 and does not imply the inclusion a horizontal platform surface. The rotatable seat carriage pedestal can be configured with a minimal horizontal platform surface or no horizontal platform surface to the extent such horizontal platform surface is not needed for the mounting of other components. The rotatable platform 120 or a rotatable seat carriage pedestal can include mounting points, which can, but need not be part of a platform, for the seat carriage pedestal 150, the third drive mechanism 430, or other components.

In one embodiment, the device can be made on a larger scale such that the seat carriage is replaced with a fully enclosed sphere having a seat housed completely within the sphere. The sphere can be fitted with a hatch to provide interior access, in which case full pitch and roll movement can be supported. The sphere can be formed, for example using a solid external surface material, such as plastic or metal. The sphere can be formed from a mesh or grid to allow air flow, but still provide enough contact area with the drive wheel 310 to facilitate reorientation.

Figure 6:
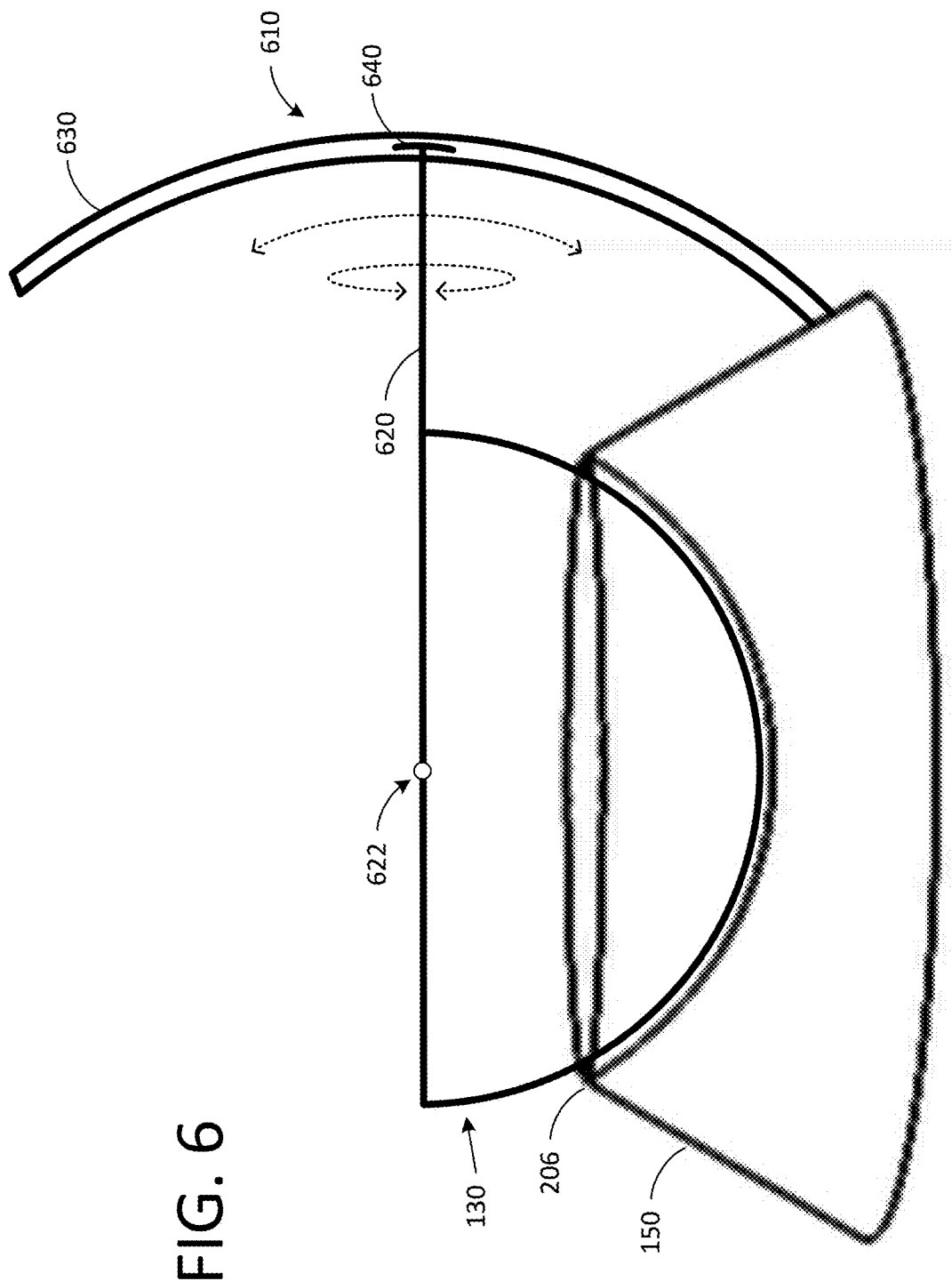
FIG. 6 illustrates an alignment mechanism that prevents rotation of the seat carriage around a vertical axis relative to the seat carriage pedestal.

FIG. 6 illustrates an alignment mechanism 610 that prevents rotation of the seat carriage 130 around a vertical axis relative to the seat carriage pedestal 150 in accordance with one embodiment. As may be appreciated, when the drive wheel 310 is reoriented about a vertical axis by the turntable 450, the seat carriage 130 may tend to rotate with the drive wheel, particularly when the weight of the seat carriage is supported by the drive wheel. In this embodiment, the yaw of the seat carriage 130, however, is controlled by the rotatable platform 120 and not the drive wheel/turntable combination. If the seat carriage 130 rotates in part or completely with the drive wheel 310 and turntable 450, the drive wheel may not be able to be oriented properly relative to the seat carriage to achieve a desired change in pitch and roll when the drive wheel drives the seat carriage 130. Although the turntable can be rotated very quickly so that the drive wheel slips on its contact point on the seat carriage as it rotates about a vertical axis, some rotation of the seat carriage may occur. Accordingly, an alignment mechanism can be used to restrict the rotation of the seat carriage 130 about a vertical axis relative to the seat carriage pedestal 150.

Referring to FIG. 6, the alignment mechanism 610 can include an alignment pin 620 that engages with a track 630. The alignment pin 620 can be configured to extend along an axis extending from a spherical center 622 of the external driven support surface 232 of the seat carriage 130 to the pin. The spherical center 622 of the external driven support surface 232 refers to the center of a virtual sphere of which the external driven support surface 232 forms a part. The spherical center, as used herein, is not intended to refer to an actual physical component or part. The track 630 with which the pin engages can be configured to be of a shape of a portion of a vertically oriented circle centered on the spherical center of the external driven support surface 232. The track can be mounted or secured to the seat carriage pedestal 150 or rotatable platform 120 so that all three rotate in unison. The pin 620, when engaged with the track 630, permits rotation of the seat carriage around the axis extending from the spherical center to the pin 620, allowing roll of the seat carriage around that axis. The pin 620 can also slide within the track 630 to permit rotation of the seat carriage around a horizontal axis passing orthogonally through the center of the vertically oriented circle, thereby permitting changes in pitch. Accordingly, the pin 620 and track 630 work together to permit changes in roll and pitch of the seat carriage 130 while constraining rotation of the seat carriage 130 about a vertical axis relative to the seat carriage pedestal 150.

As illustrated in FIG. 6, primarily for purposes of demonstration, the track 630 is shown some distance away from the seat carriage 130. The track 630, however, can be positioned closer to or further away from the seat carriage 130. In one embodiment, the track 630 can be positioned alongside the seat carriage 130. For example, the track 630 can be integrated in part into the seat carriage pedestal 150 and can follow the shape of the seat carriage pedestal as it extends above the rim 206. Optionally, the pin can be rotatably and slidably secured within the track 630 by a slide that slides within the track 630.

Figure 7:
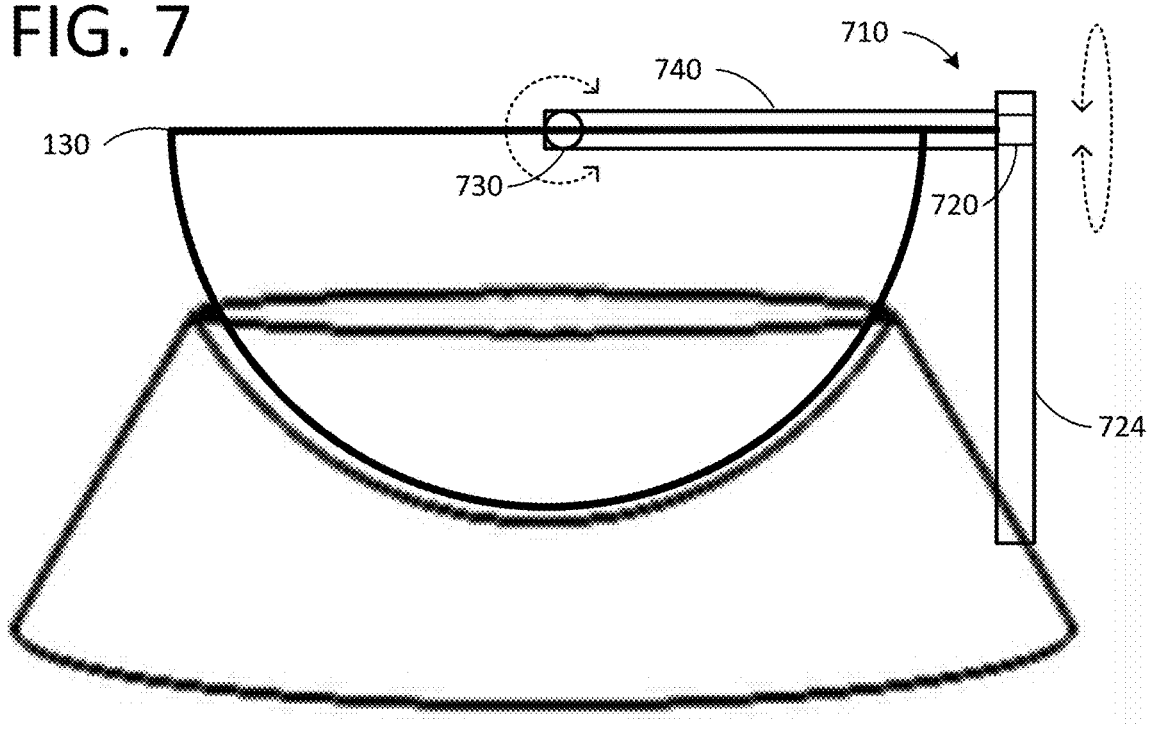
FIG. 7 illustrates a perspective view of an alignment mechanism.
Figure 8:
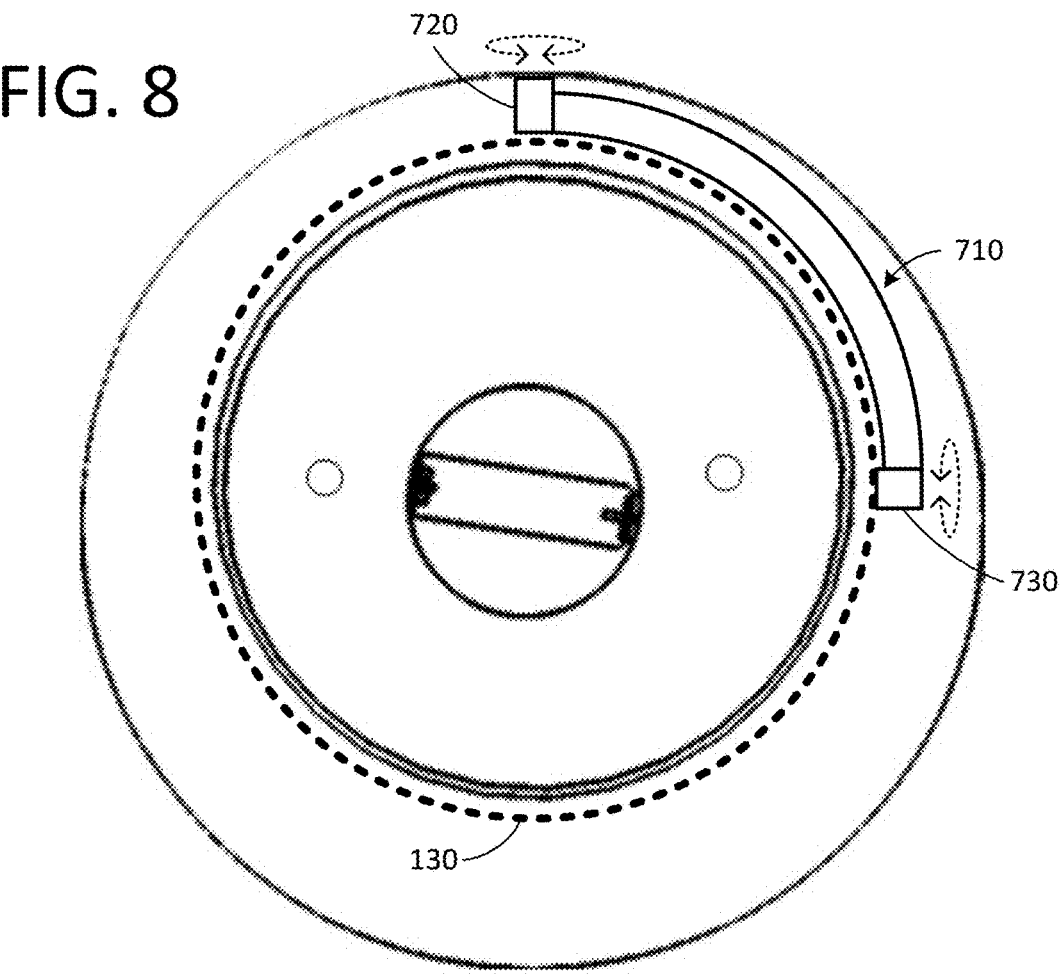
FIG. 8 illustrates an overhead view of the alignment mechanism of FIG. 7.

FIG. 7 illustrates a perspective view of an alignment mechanism 710 that prevents rotation of the seat carriage 130 around a vertical axis relative to the seat carriage pedestal 150 in accordance with one embodiment. FIG. 8 illustrates an overhead view of the alignment mechanism 710 of FIG. 7. Referring to FIGS. 7 and 8, the alignment mechanism 710 can include a first gimbal 720 that can be mounted to the carriage pedestal 150 or the rotatable platform 120. For example, the gimbal 720 can be mounted on the top of an arm 724 that is in turn mounted to and extends up from a portion of the carriage pedestal 150 or the rotatable platform 120. The first gimbal 720 can be configured to have a horizontal axis of rotation that extends through the spherical center of the external driven support surface 232. The alignment mechanism 710 can include a second gimbal 730 that can be mounted to the seat carriage 130 and having an axis of rotation that extends through the spherical center of the external driven support surface 232. The alignment mechanism 710 can also include a connecting arm 740 connecting the first gimbal to the second gimbal such that the axis of rotation of the second gimbal is orthogonal to and free to rotate about the axis of rotation of the first gimbal. The first gimbal 720 permits rotation of the seat carriage around a horizontal axis extending from the spherical center, allowing roll of the seat carriage around that axis. The second gimbal 730 permits rotation of the seat carriage around an orthogonal axis passing through the spherical center, thereby permitting changes in pitch. Accordingly, the first gimbal 720, the second gimbal 730 and the arm 740 work together to permit changes in roll and pitch of the seat carriage 130 while constraining rotation of the seat carriage 130 relative to the seat carriage pedestal 150.

In order to control the drive mechanisms to achieve a desired yaw, pitch and roll, the electronics 440 can be configured to obtain the current orientation of the seat carriage 130 from an orientation sensor (not illustrated). The orientation sensor can include, for example, a gyroscope attached to or contained within the seat carriage 130. The orientation sensor can be or include, for example, an inertial measurement unit. The orientation sensor can include, for example, one or more optical scanners that read machine-readable markings printed on the driven support surface 232. The markings can be barcodes or similar markings that can be electronically decoded to determine the position of the seat carriage 130. The one or more optical scanners can be positioned within the seat carriage pedestal 150.

The orientation sensor can include, for example a first position sensor, such as an angle position sensor, configured to determine an orientation of the rotatable platform relative to the base. The orientation sensor can include a second position sensor configured to determine a roll of the seat carriage. The second position sensor can be, for example, an angle position sensor that senses the angle position of the first gimbal. The orientation sensor can include a third position sensor configured to determine a pitch of the seat carriage. The third position sensor can be, for example, an angle position sensor that senses the angle position of the second gimbal.

In one embodiment, the seating device 100 can be outfitted with a jitter or vibration mechanism (not illustrated) that can be activated to simulate shaking. The vibration mechanism can be incorporated into the seat carriage 130, the seat carriage pedestal 150 or any portion of the device 100 through which vibrations can be transmitted to the seat 140.

Figure 9:
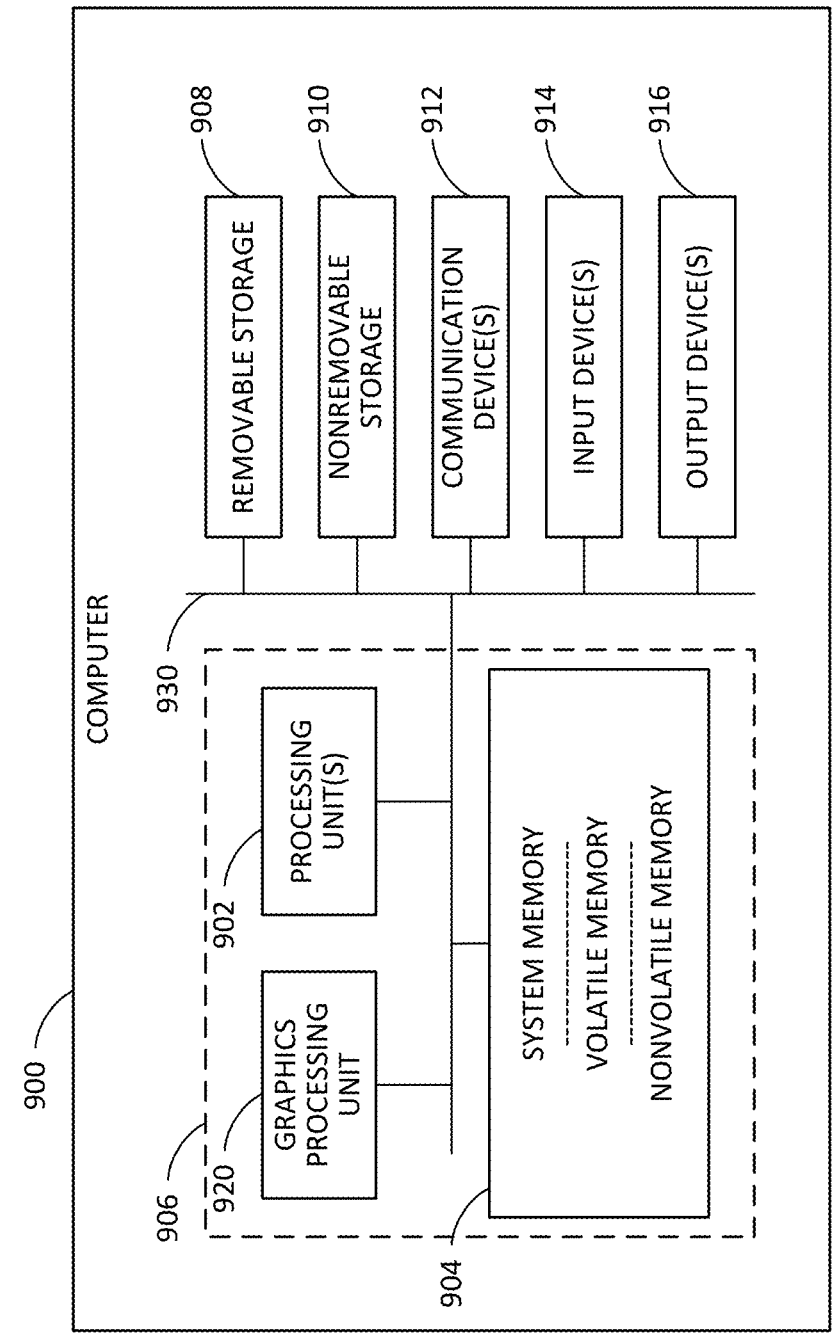
FIG. 9 illustrates an example computer that can be used as part of or to control the seating device.

FIG. 9 illustrates an example computer 900 that can be used to interface to the electronics 440 in order to control the seating device 100 or that can be used as a subset of or all of the electronics 440, along with appropriate interfaces to the orientation sensor and drive mechanisms. Components of the embodiments disclosed herein, which may be referred to as modules, engines, processes, functions or the like, can be implemented by configuring one or more instances of the example computer using special purpose software or applications, possibly in different configurations and optionally networked, as a computer system. The computer 900 can be any of a variety of general purpose computers such as, for example, a server, a desktop computer, a laptop computer or a mobile computing device.

On a general purpose computer, a processor typically executes computer programs which include an operating system and applications. The operating system is a computer program running on the computer that manages access to various resources of the computer by the applications and the operating system. The various resources generally include memory, storage, communication interfaces, input devices and output devices.

With reference to FIG. 9, the example computer 900 includes at least one processing unit 902 and memory 904. The computer can have multiple processing units 902 and multiple devices implementing the memory 904. A processing unit 902 can include one or more processors or processing cores (not shown) that operate independently of each other. Additional co-processing units, such as graphics processing unit 920, also can be present in the computer. The memory 904 may include volatile devices (such as dynamic random access memory (DRAM) or other random access memory device), and non-volatile devices (such as a read-only memory, flash memory, and the like) or some combination of the two. This configuration of memory is illustrated in FIG. 9 by dashed line 906. The computer 900 may include additional storage (removable and/or non-removable) including, but not limited to, magnetically-recorded or optically-recorded disks or tape. Such additional storage is illustrated in FIG. 9 by removable storage 908 and non-removable storage 910. The various components in FIG. 9 are generally interconnected by an interconnection mechanism, such as one or more buses 930.

A computer storage medium is any medium in which data can be stored in and retrieved from addressable physical storage locations by the computer. Computer storage media includes volatile and nonvolatile memory devices, and removable and non-removable storage media. Memory 904 and 906, removable storage 908 and non-removable storage 910 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 900 may also include communication device(s) 912 through which the computer communicates with other devices over a communication medium such as a computer network. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals.

Communications device(s) 912 can include, for example, a network interface or radio transmitter, that interface with the communication media to transmit data over and receive data from signals propagated through communication media. The communication device(s) 912 can include one or more radio transmitters for telephonic communications over cellular telephone networks, and/or wireless connections to a computer network. For example, a cellular connection, a Wi-Fi connection, a Bluetooth connection, and other connections may be present in the computer. Such connections support communication with other devices, such as to support voice or data communications.

The computer 900 may have various input device(s) 914 such as a keyboard, mouse, touchscreen and pen, image input devices, such as still and motion cameras, audio input devices, such as a microphone, and various sensors, such as accelerometers, thermometers and magnetometers. Output device(s) 916 such as a display, speakers, printers, and so on, also may be included.

The various storage 910, communication device(s) 912, output devices 916 and input devices 914 can be integrated within a housing of the computer, or can be connected through various input/output interface devices on the computer, in which case the reference numbers 910, 912, 914 and 916 can indicate either the interface for connection to a device or the device itself as the case may be.

An operating system of the computer typically includes computer programs, commonly called drivers, that manage access to the various storage 910, communication device(s) 912, output devices 916 and input devices 914. Such access generally includes managing inputs from and outputs to these devices. In the case of communication device(s), the operating system also may include one or more computer programs for implementing communication protocols used to communicate information between computers and devices through the communication device(s) 912.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs may be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs).

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the term "based upon" shall include situations in which a factor is taken into account directly and/or indirectly, and possibly in conjunction with other factors, in producing a result or effect. In the claims, a portion shall include greater than none and up to the whole of a thing. In the claims, ordinal numbers referencing components (e.g. first component, second component, third component) are used only to distinguish different components with like names, and are not intended to imply any ordering of the components they reference.

The invention claimed is:

1. A dynamically orientable seating device comprising:
    an actuatable seat carriage having a driven support surface shaped in a form of a three-dimensional portion of a sphere;
    a seat fixedly mounted on or within the seat carriage;
    a seat carriage pedestal receiving the seat carriage and fixing a horizontal and vertical position of the seat carriage relative to the seat carriage pedestal;
    a turntable positioned beneath the seat carriage and having a vertical axis of rotation centered on a lowest point on the driven support surface of the seat carriage;
    a first drive mechanism configured to rotate the turntable about the vertical axis of rotation;
    a second drive mechanism comprising a drive wheel mounted directly or indirectly to the turntable, the drive wheel configured to engage with and support the lowest point on the driven support surface of the seat carriage, wherein the drive wheel has a horizontal axis of rotation that rotates with the turntable as the turntable rotates about the vertical axis of rotation; and
    an orientation sensor configured to detect an orientation of the seat carriage.

2. The device of claim 1, further comprising:
    a base, wherein the seat carriage pedestal is rotatably mounted directly or indirectly to the base and to rotate about a vertical axis relative to the base; and
    a third drive mechanism configured to rotate the rotatable platform about the vertical axis relative to the base.

3. The device of claim 2, wherein the seat carriage pedestal is a rotatable seat carriage pedestal mounted directly to the base.

4. The device of claim 2, further comprising:
a rotatable platform rotatably mounted on the base, wherein the seat carriage pedestal is mounted to the rotatable platform.

5. The device of claim 4, wherein the turntable is mounted on and rotates relative to the rotatable platform.

6. The device of claim 1, further comprising an alignment mechanism configured to prevent rotation around a vertical axis of the seat carriage relative to the seat carriage pedestal.

7. The device of claim 6, wherein the alignment mechanism comprises:
an alignment pin that extends from the seat carriage along an axis extending from a center of the sphere; and
an alignment track fixed relative to the seat carriage pedestal, the alignment track having a shape of a portion of a vertically oriented circle centered on the center of the sphere,
whereby the alignment pin and the alignment track engage to permit only pitch and roll of the seat carriage, and whereby yaw of the seat carriage is established by the rotatable platform.

8. The device of claim 6, wherein the alignment mechanism comprises:
a first gimbal fixed relative to the seat carriage pedestal, the first gimbal having a horizontal axis of rotation that extends through the center of the sphere;
a second gimbal mounted to the seat carriage and having an axis of rotation that extends through the center of the sphere; and
a connecting arm connecting the first gimbal to the second gimbal such that the axis of rotation of the second gimbal is orthogonal to and free to rotate about the axis of rotation of the first gimbal.

9. The device of claim 8, wherein the orientation sensor comprises:
a first position sensor configured to determine an orientation of the rotatable platform relative to the base;
a second position sensor configured to determine an angle of the first gimbal; and
a third position sensor configured to determine an angle of the second gimbal.

10. The device of claim 1, wherein the orientation sensor comprises:
a first position sensor configured to determine an orientation of the rotatable platform relative to the base;
a second position sensor configured to determine a roll of the seat carriage; and
a third position sensor configured to determine a pitch of the seat carriage.

11. The device of claim 1, wherein the driven support surface comprises a plurality of machine-readable markings readable to determine the orientation of the seat carriage, and wherein the orientation sensor comprises at least one optical scanner configured and positioned to read the machine-readable markings.

12. The device of claim 1, wherein the orientation sensor comprises a gyroscope attached to the seat carriage.

13. A dynamically orientable seating device comprising:
an actuatable seat carriage having a driven support surface shaped in a form of a three-dimensional portion of a sphere;
a seat fixedly mounted on or within the seat carriage;
a seat carriage pedestal receiving the seat carriage and fixing a horizontal and vertical position of the seat carriage relative to the seat carriage pedestal;
a drive mechanism comprising a motor-driven drive wheel having a rotating circumference that directly contacts, supports, and drives the driven support surface of the seat carriage, wherein rotation of the drive wheel drives the driven support surface to cause a reorientation of the seat carriage; and
an orientation sensor configured to detect an orientation of the seat carriage.

14. The device of claim 13, wherein the orientation sensor comprises:
a first position sensor configured to determine a roll of the seat carriage; and
a second position sensor configured to determine a pitch of the seat carriage.

15. The device of claim 13, wherein the actuatable seat carriage has a plurality of machine-readable markings readable to determine the orientation of the seat carriage, and wherein the orientation sensor comprises at least one optical scanner configured and positioned to read the machine-readable markings.

* * * * *